US012701537B2

(12) United States Patent
Ciochina et al.

(10) Patent No.: US 12,701,537 B2
(45) Date of Patent: Aug. 4, 2026

(54) SYSTEM AND METHOD FOR ISOLATING AND LOCATING WIRELESS PHONES

(71) Applicant: COGNYTE TECHNOLOGIES ISRAEL LTD, Herzliya (IL)

(72) Inventors: Victor-Cristian Ciochina, Herzliya (IL); Riginos Samaras, Herzliya (IL); Constantin Tanasa, Herzliya (IL)

(73) Assignee: COGNYTE TECHNOLOGIES ISRAEL LTD, Herzliya Pituach (IL)

( * ) Notice: Subject to any disclaimer, the term of this patent is extended or adjusted under 35 U.S.C. 154(b) by 298 days.

(21) Appl. No.: 18/586,481

(22) Filed: Feb. 25, 2024

(65) Prior Publication Data

US 2025/0274895 A1     Aug. 28, 2025

(51) Int. Cl.
*H04W 64/00*     (2009.01)
*G01S 5/02*     (2010.01)

(52) U.S. Cl.
CPC ........... *H04W 64/00* (2013.01); *G01S 5/0295* (2020.05)

(58) Field of Classification Search
CPC ..... H04W 4/023; H04W 64/00; H04W 4/027; H04W 64/003; H04W 72/0453; G01S 5/0295
See application file for complete search history.

(56) References Cited

U.S. PATENT DOCUMENTS 9,237,424 B2 * 1/2016 Nelkenbaum ......... H04W 12/12
9,247,216 B2 * 1/2016 Hazzani ........... G08B 13/19645
(Continued)

FOREIGN PATENT DOCUMENTS

WO     2024017760     1/2024

OTHER PUBLICATIONS

European Search Report—corresponding European Application No. 25158494, dated Jul. 11, 2025, 5 pages.

*Primary Examiner* — Bailor C Hsu
(74) *Attorney, Agent, or Firm* — ISUS Intellectual Property PLLC; Anthony Jason Mirabito

(57)      ABSTRACT

A system for locating a mobile communication terminal, the system having an interrogation device, which is configured to solicit a mobile communication terminal of a wireless communication network to establish temporary communication with the interrogation device in an original bandwidth employed for communication between the interrogation device and the mobile communication terminal. Processors configured to isolate the uplink bandwidth of the mobile communication terminal by: configuring the interrogation device to remove a downlink bandwidth, to the wireless communication terminal, from an end of the original bandwidth to create a new downlink bandwidth; calculating an uplink bandwidth at the end of the original bandwidth to be less than the bandwidth removed from the downlink bandwidth; and reconfigure the mobile communication terminal to uplink to the interrogation device on the calculated uplink bandwidth at the end of the original bandwidth. The system further comprising a power detection device (PDD) configured to measure a power of a radio frequency (RF) signal emitted by the mobile communication terminal and having bandwidth filter configured to measure less than a calculated uplink bandwidth and locate the mobile communication terminal.

19 Claims, 2 Drawing Sheets

(56) References Cited

U.S. PATENT DOCUMENTS

| | | | |
|---|---|---|---|
| 9,749,921 B2 * | 8/2017 | Barlev | H04L 63/0464 |
| 10,582,370 B2 * | 3/2020 | Goldfarb | H04W 12/06 |
| 10,749,688 B2 * | 8/2020 | Goldfarb | H04L 63/304 |
| 2010/0304706 A1 * | 12/2010 | Haverty | H04K 3/65 |
| | | | 455/404.1 |
| 2012/0086555 A1 * | 4/2012 | Nelkenbaum | G06Q 50/265 |
| | | | 340/10.1 |
| 2017/0111836 A1 * | 4/2017 | Barlev | H04W 60/00 |
| 2018/0109940 A1 * | 4/2018 | Goldfarb | H04W 12/06 |
| 2019/0215655 A1 | 7/2019 | Tanasa et al. | |
| 2021/0058146 A1 * | 2/2021 | Eichen | H04B 7/1851 |
| 2021/0320773 A1 | 10/2021 | Manolakos et al. | |

* cited by examiner

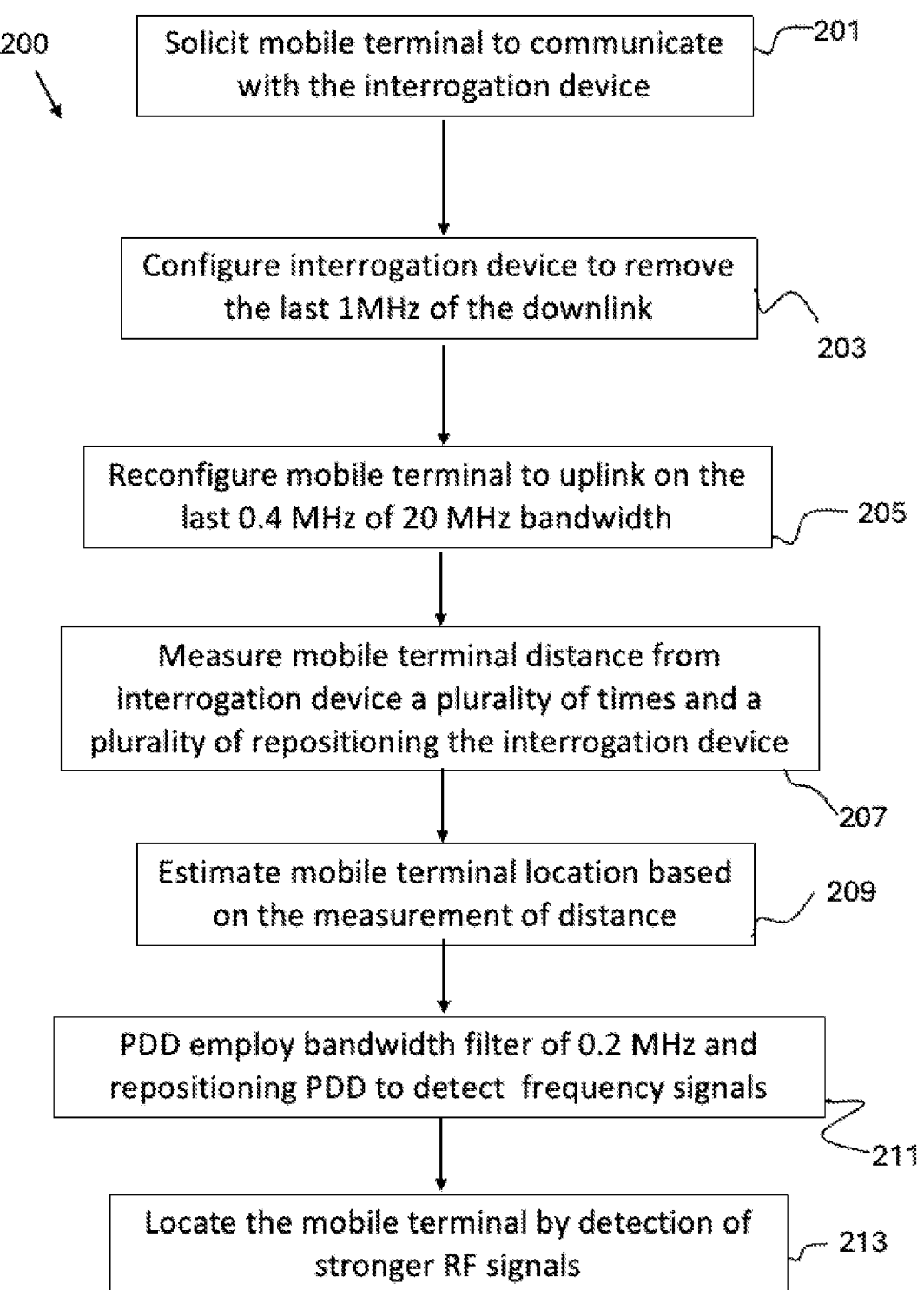

200

Solicit mobile terminal to communicate
with the interrogation device                    201

Configure interrogation device to remove
the last 1MHz of the downlink                    203

Reconfigure mobile terminal to uplink on the
last 0.4 MHz of 20 MHz bandwidth                 205

Measure mobile terminal distance from
interrogation device a plurality of times and a
plurality of repositioning the interrogation device   207

Estimate mobile terminal location based
on the measurement of distance                   209

PDD employ bandwidth filter of 0.2 MHz and
repositioning PDD to detect frequency signals    211

Locate the mobile terminal by detection of
stronger RF signals                              213

FIG. 2

SYSTEM AND METHOD FOR ISOLATING AND LOCATING WIRELESS PHONES

BACKGROUND

Various types of monitoring systems are used for tracking and/or collecting information on cellular phones or other wireless communication terminals. The present disclosure relates generally to mobile communication, and specifically to locating a mobile communication terminal on a time-division duplexing frequency (TDD) network.

SUMMARY OF DESCRIBED SUBJECT MATTER

In one aspect of the current disclosure, there is system for locating a mobile communication terminal, the system comprising an interrogation device, which is configured to solicit a mobile communication terminal of a wireless communication network by imitating a base station of the wireless communication network to establish temporary communication with the interrogation device in an original bandwidth or frequency range employed for communication between the interrogation device and the mobile communication terminal.

The system having one or more processors configured to isolate the uplink bandwidth of the mobile communication terminal from the downlink bandwidth of the interrogation device by; configuring the interrogation device to remove a downlink bandwidth, to the wireless communication terminal, from an end of the original bandwidth to create a narrowed downlink bandwidth; calculating an uplink bandwidth at the end of the original bandwidth to be less than the downlink bandwidth removed from the original bandwidth; and reconfiguring the mobile communication terminal to uplink to the interrogation device on the calculated uplink bandwidth at the end of the original bandwidth.

A power detection device (PDD) configured to measure a power of a radio frequency (RF) signal emitted by the mobile communication terminal and having bandwidth filter configured to measure a bandwidth less than or equal to the calculated uplink bandwidth to locate the mobile communication terminal.

In another aspect of the current disclosure, the system is employed in a time-division duplexing frequency network and an interrogation device is configured to remove a non-standard downlink of the original bandwidth, and a narrowed downlink bandwidth is a non-standard bandwidth of the original bandwidth. Wherein the bandwidth removed from the downlink is between 1 to 45 percent of the original bandwidth. Also wherein, the system first receives an estimated location of the mobile communication terminal of interest.

In yet another aspect of the current disclosure, the system wherein the PDD is configured to: be portable and move through multiple geographical positions in an area of interest; at each of the geographical position measures power of the mobile communication terminal radio frequency (RF) signal; and determine when higher measurements of power indicate that the mobile communication terminal is close to the PDD and locate the mobile communication terminal.

In one aspect of the current disclosure there is system that when the original bandwidth is 20 MHz, the system configures the uplink to be 0.4 MHz at the end of the 20 MHz and the downlink is configured to be 19 MHz from the start of the 20 MHz and the PDD is configured to detect power at 0.2 MHz.

In another aspect there is a system for isolating an uplink bandwidth signal of a mobile communication terminal in a time-division duplexing frequency network, the system comprising an interrogation device, which is configured to solicit a mobile communication terminal of a wireless communication network by imitating a base station of the wireless communication network to establish temporary communication with the interrogation device in an original bandwidth employed for communication between the interrogation device and the mobile communication terminal.

One or more processors configured to isolate the uplink bandwidth of the mobile communication terminal from the downlink bandwidth of the interrogation device by; configuring the interrogation device to remove a downlink bandwidth, to the wireless communication terminal, from the original bandwidth to create a narrowed downlink bandwidth; calculating an uplink bandwidth to be less than and inside of the downlink bandwidth removed from the original bandwidth; and reconfiguring the mobile communication terminal to uplink to the interrogation device on the calculated uplink bandwidth of the original bandwidth, wherein there is no interference from the downlink signal to the uplink signal.

Wherein the removed downlink bandwidth is at an end of the original bandwidth and the calculated uplink is at the end of the original bandwidth and less than the removed downlink bandwidth. Wherein the removed downlink bandwidth is a non-standard bandwidth of the original bandwidth, and the calculated uplink bandwidth is a non-standard bandwidth of the original bandwidth and less than the removed downlink bandwidth. Also, the system is employed in a time-division duplexing (TDD) frequency network.

In yet another aspect, there is a method for locating a mobile communication terminal, the method comprising: providing and interrogation device, which is configured to solicit a mobile communication terminal of a wireless communication network by imitating a base station of the wireless communication network to establish temporary communication with the interrogation device in an original bandwidth employed for communication between the interrogation device and the mobile communication terminal; providing a portable power detection device (PDD) configured to measure a power of an RF signal emitted by the mobile communication terminal; providing one or more processors.

The method continues by isolating, by the one or more processors, the uplink bandwidth of the mobile communication terminal from the downlink bandwidth of the interrogation device by; configuring the interrogation device to remove a downlink bandwidth, to the wireless communication terminal, from an end of the original bandwidth to create a narrowed downlink bandwidth; calculating an uplink bandwidth at the end of the original bandwidth to be less than the downlink bandwidth removed from the original bandwidth; and reconfiguring the mobile communication terminal to uplink to the interrogation device on the calculated uplink bandwidth at the end of the original bandwidth.

In one aspect, the method has a user moving the PDD through multiple geographical positions in an area of interest; measuring, by the PDD, a power of RF signal in a bandwidth less than or equal to the calculated uplink bandwidth at multiple geographical positions; and determining, by the user, the location of the mobile communication terminal when higher measurements of power are measured indicating that the mobile communication terminal is close to the PDD.

Wherein the method is employed in a time-division duplexing (TDD) frequency network. Also, when the original bandwidth is 20 MHz, the one or more processors configures the uplink to be 0.4 MHz at the end of the 20 MHz and configures the downlink to be 19 MHz from the start of the 20 MHz and wherein the PDD is configured to detect power at 0.2 MHz.

Certain embodiments of the present disclosure may include some, all, or none of the above advantages. One or more other technical advantages may be readily apparent to those skilled in the art from the figures, descriptions and claims included herein. Moreover, while specific advantages have been enumerated above, various embodiments may include all, some or none of the enumerated advantages.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

FIG. 2 is a flow diagram for a method for locating the location of a mobile phone, illustrative of some examples of aspects of at least some embodiments of the present disclosure.

DETAILED DESCRIPTION

Figure 1:
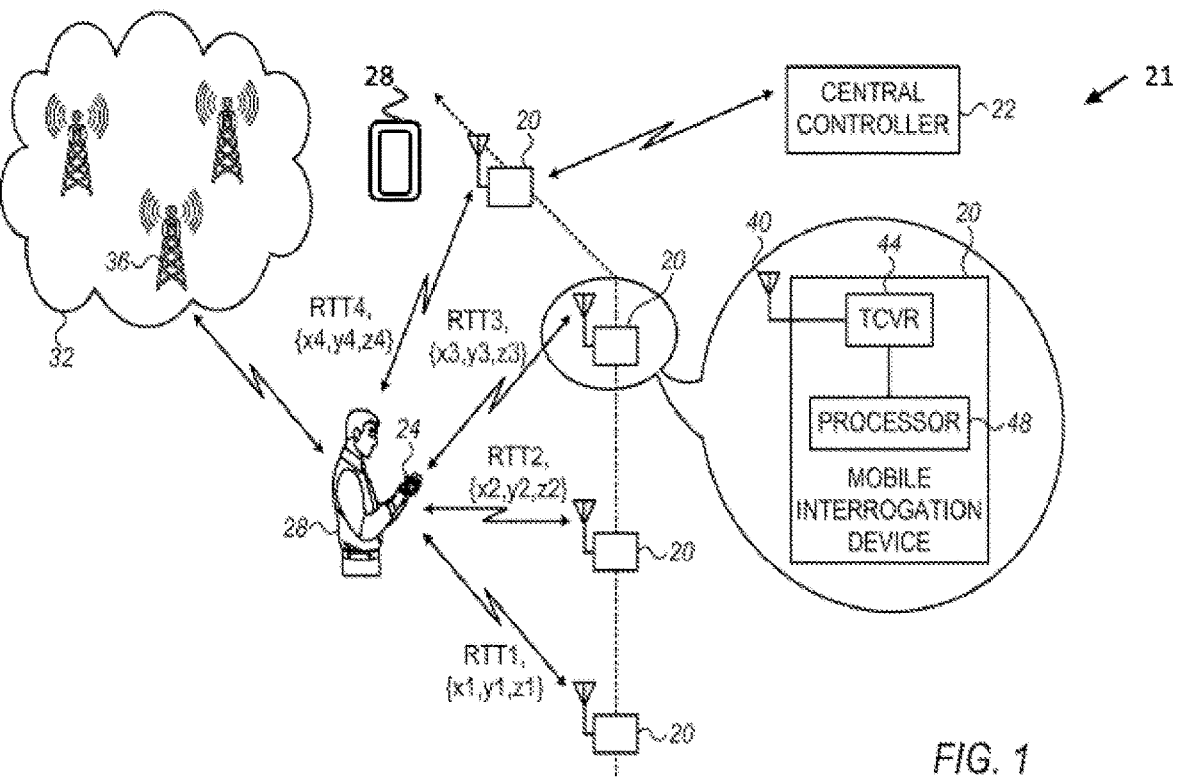
FIG. 1 is a schematic illustration of a system for locating a mobile phone, illustrative of some examples of aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

The term "mobile communication terminal" as used in the present application, refers to a mobile phone (such as a smartphone), tablet computer, or any other wireless-enabled device. Thus, although, for simplicity, the present description generally uses the term "phone", "mobile terminal" or "mobile phone," it is noted that embodiments described herein may be used to estimate the location of any suitable type of mobile communication terminal. Mobile communication terminals are also referred to herein as User Equipment (UE).

Various embodiments provide a technical solution by reconfiguring bandwidth values in various devices of a location tracking system to provide improved tracking of the geographical locations of mobile communication terminals. In some embodiments, an isolation system will solicit a phone on a time-division duplexing frequency (TDD) network and isolate the mobile communication terminal's uplink bandwidth from a downlink bandwidth. In some embodiments, the isolating of the mobile communication terminal's uplink is done in order to track the mobile terminal location.

Embodiments that are described herein provide improved methods and systems for tracking the geographical locations of mobile phones and other wireless communication terminal (hereinafter mobile communication terminal) and may be employed when the mobile communication terminal network is a TDD network protocol. In the disclosed embodiments, a location-tracking system comprises an interrogation device that is configured to imitate the operation of a base station of the mobile communication network with which the mobile communication terminal is normally associated, and to solicit mobile communication terminals to establish temporary communication in order to monitor, reconfigure certain parameters, and track them.

Typically, mobile communication networks employ one of two frequency protocols. FDD or Frequency-division duplexing, is a protocol that employs two different radio frequencies for transmitter and receiver operation, that is, assigning the transmitter and receiver to different communication channels. Alternatively, a TDD protocol may be employed by the mobile communication networks. Typically, a TDD protocol employs time rather than frequency to separate the transmission and reception of the signals, and thus a single frequency is assigned to the mobile communication terminal for both directions.

Reference is now made to FIG. 1, which is a schematic illustration of a location-tracking system 21 for estimating the location of a mobile communication terminal 24 using an interrogation device 20, in accordance with some embodiments described herein. In some embodiments, the inclusion of a power detection device (PDD) 28 provides a location and not only an estimation of the mobile communication terminal 24. The system 21 configuration shown is an exemplary configuration that is chosen purely for the sake of conceptual clarity. In alternative embodiments, any other suitable system configuration can be used. The disclosed system 21 may be used, for example, for tracking users 28 with mobile communications terminals 24. Mobile communication terminals 24 communicate with a wireless communication network 32 via one or more base stations 36.

In some embodiments, interrogation device 20 comprises an antenna 40, a transmitter-receiver (transceiver/TCVR) 44, and a processor 48. Processor 48 may exchange communication with the mobile communication terminal via transceiver 44 and antenna 40. In some embodiments, the interrogation device 20 is configured to solicit selected mobile communication terminals 24 to establish temporary communication with interrogation device 20, by imitating the operation of a base station. Communication from a mobile communication terminal to a base station is usually referred to as an uplink. Communication from a base station to a mobile communication terminal is usually referred to as a downlink.

Interrogation device 20 may solicit a mobile communication terminal to communicate in various ways, which may depend on the wireless communication network's protocol or protocols, supported by the mobile communication terminal and the transceiver. For example, in some wireless communication network types, the mobile communication terminal measures the signals transmitted by base stations that are within range and maintains a list of base stations that are candidates for hand-off. Some nonlimiting examples of the hand-off protocols are signal strength and/or on predefined priorities assigned to the base stations. In some embodiments, interrogation device 20 solicits the mobile communication device 24 by imitating the aspect of the protocol for switching to it as the base station. In some embodiments, after soliciting a mobile communication terminal and replacing the base station, the interrogation device 20 may reconfigure the mobile communication terminal to transmit signals on specified channels. Such a process is typically unnoticeable to the user.

In some embodiments, interrogation device 20 is mobile or portable, i.e., capable of moving through different geographical positions. For example, the interrogation device may be installed in a vehicle such as a car, in an airborne platform such as an Unmanned aerial vehicle (UAV), in a suitcase or other hand-portable configuration for carrying by an operator, or in any other suitable way. Transceiver 44 typically carries out the various transmission and reception functions of the interrogation device.

Processor 48 may carry out various computation functions of interrogation device 20. In some embodiments, the system further comprises a central controller 22 that receives distance measurements acquired by interrogation device 20 and uses them to calculate the estimated geographical locations of solicited mobile communication terminals. Central controller 22 may be connected to interrogation device 20, for example using a suitable wireless link or even over network 32. In some embodiments, central controller 22 functions are done by the processor 48 and therefore no central controller is part of the system. In some embodiments the functions of processor 48 and central controller 22 may generally be performed by one or more processors, internal and/or external to the interrogation device.

In the example of FIG. 1, device 20 is moved through four geographical positions along a certain path (marked with a dashed arrow). In some embodiments, the number of positions may be considerably larger. At each geographical position, and while communicating with the mobile communication terminal, transceiver 44 estimates a value that is indicative of the distance to the terminal. The value may comprise, for example, the Round-Trip Time (RTT) between the mobile communication terminal and the interrogation device. In some embodiments, interrogation device 20 comprises a Global Positioning System (GPS) receiver to record its own location at each geographical position in which RTT is measured. In some embodiments, the location of mobile communication terminal 24 is calculated based on the estimated RTTs, or similar measures to approximate location, and respective interrogation device location when each value is measured, e.g., using a Global Positioning System (GPS) receiver. In some embodiments, probabilistic distribution of the location of mobile communication terminal 24 is done based on distance and addition of these probabilities. In some embodiments, aggregating measurements over multiple locations of the interrogation device estimates the mobile communication terminal location.

In some embodiments, the disclosed techniques may also be carried out using two or more interrogation devices similar to interrogation device 20, each capable of moving through a respective plurality of geographical positions. The measurements acquired by the multiple interrogation devices may be processed jointly by central controller 22, so as to calculate the estimated location of a mobile communication device of interest.

In some embodiments, a PDD 28 is part of the location-tracking system 21. In some embodiments, after the location-tracking system generates an estimation of mobile communication terminal 24 location, a location of higher accuracy is determined using the PDD 28. In some embodiments, PDD is a handheld measurement device with an antenna (not shown) that measures the power of an RF signal emitted by the mobile communication terminal. Therefore, the PDD may detect stronger signals i.e. higher measurements of power, when the PDD is closer to where the mobile communication terminal signal is emitted. In some embodiments, the PDD is part of any suitable location-tracking system that provides some estimation of location of a mobile communication terminal. In alternative embodiments, any other suitable system for establishing an estimation of location of a mobile communication terminal may be used with the PDD.

Reference is further made to FIG. 2, which is a flow diagram for a method 200 performed by a location-tracking system 21, in accordance with some embodiments described herein.

At block 201, the interrogation device of the location-tracking system is configured to solicit the mobile communication terminal to communicate with the interrogation device instead of a base station of the wireless communication network.

At block 203, the interrogation device of the location-tracking system is configured to downlink with the mobile communication terminal on any non-standard bandwidth or frequency range detailed below. The interrogation device may operate on the same bandwidth or frequency range, hereinafter bandwidth, that the mobile communication terminal was employing with the base stations of the wireless communication networks, and this bandwidth will be referred to as the original bandwidth.

Typically, there are standard third generation partnership project (3GPP) bandwidths for TDD protocols employed for communication between a mobile communication terminal and a base station, in our example an interrogation device imitating a base station. These standard bandwidths typically are 5, 10, 15 or 20 MHz if using 4G technology or between 5 to 100 MHz in steps of 5 MHz in the 5G technology. When changes are made to these standard bandwidths, they are usually made at both ends of the bandwidth. That is, if a 20 MHz bandwidth is changed to 15 MHz bandwidth, then 2.5 MHz are removed from both ends. Non-standard bandwidths for the purposes of this disclosure are any bandwidth value that is not a standard bandwidth used in TDD protocols.

In some embodiments, the non-standard bandwidth used for downlinks is from the start of the original bandwidth, that is, removing a non-standard bandwidth value to downlink at the end of the original bandwidth. The non-standard bandwidth for the interrogation device to downlink may be any non-standard value from around 55% to around 99% of the start of the original bandwidth. In some embodiments, the bandwidth value to downlink is a standard bandwidth value from the start of the original bandwidth, and not at both ends of the original bandwidth. In some embodiments, the method of configuring the interrogation device may be employed with any suitable location-tracking system that provides some estimation of location of a mobile communication terminal.

At block 205, the interrogation device of the location-tracking system is configured to reconfigure the uplink bandwidth of the mobile communication terminal. In some embodiments, the interrogation device reconfigures the mobile communication terminal to uplink to the interrogation device in a specific range of frequencies located at the end of the original bandwidth. In some embodiments, the specific range of frequencies to uplink is calculated to be outside of the downlink bandwidth of the interrogation device that was reconfigured to a non-standard downlink bandwidth. The calculated bandwidth for the mobile communication terminal to uplink may be any value at the end of the original bandwidth up to and including 50% of the original bandwidth. In some embodiments, the value is a standard bandwidth located at the end of the original bandwidth, and not at both ends of the bandwidth. In some embodiments, the uplink bandwidth of the mobile communication terminal may be reconfigured before configuring the downlink bandwidth of the interrogation device. In some embodiments, the method of reconfiguring the mobile communication terminal of interest may be employed with any suitable location-tracking system that provides some estimation of location of a mobile communication terminal.

By way of specific example, when the bandwidth for communication between the interrogation device and the mobile communication device is 20 MHz the mobile communication terminal may be reconfigured to uplink to the interrogation device on the last 0.2 to 1 MHz of the original 20 MHz bandwidth. More specifically, the uplink may be reconfigured on the last 0.4 MHz of 20 MHz bandwidth. The interrogation device, when using the 20 MHz bandwidth, may be configured to remove the last 1 MHz of its downlink and mobile communication terminal may be configured such that the uplink signal is on the last 0.4 MHz. In this example, the interrogation device will downlink in the first 19 MHz, and there is no interference from the downlink signal to the uplink signal.

Typically, interrogation devices are capable of changing bandwitdhs between standard bandwidths on both ends of the bandwidth and are not capable of changing the bandwidth to a non-standard bandwidth value or from the start of the original bandwidth, i.e. not from either end of the bandwidth. The interrogation device, in some embodiments, comprises a physical layer software that controls a radio frequency chip scheduled to operate in a standard bandwith. Typically, scheduling refers to making a sequence of allocation decisions at specific intervals and the decision that is made is based on a predictable algorithm. In some embodiments, the method of configuring the interrogation device to operate non-standard bandwidth and/or only in one end of the original bandwidth may be employed with any suitable location-tracking system that provides some estimation of location of a mobile communication terminal.

In some embodiments, the isolation of the mobile communication terminal uplink from the interrogation device downlink bandwidth is the end of the method. In TDD networks there would be no interference from the downlink signal to the uplink signal.

At block 207, the location-tracking system is configured to measure mobile communication terminal distance, using RTT or similar measurements, from the interrogation device at a plurality of repositioning of the interrogation device relative to the mobile communication terminal.

At block 209, the location-tracking system is configured to estimate the mobile communication terminal location based on the distance measurements at the plurality of repositioning of the interrogation device relative to the mobile communication terminal.

At block 211, the PDD of the location-tracking system is configured to measure radio frequency (RF) power in a frequency range. By way of specific example, the PDD employs a bandwidth filter of between 0.1 to 0.4 MHz, and in some instances 0.2 MHz in order to measure only the mobile communication terminal uplink RF power.

At block 213, the PDD of the location-tracking system is configured to find the location of mobile terminal employing power measurements of the RF signal of the mobile terminal. In some embodiments, the PDD has a bandwidth filter configured to measure a bandwidth of less than or equal to the calculated uplink bandwidth and locate the mobile communication terminal. That is, when the RF power measurements are stronger or higher recorded by the PDD, that will mean the PDD is closer in distance to where the mobile communication terminal signal is emitted from. When the RF power measurements are weaker or lower recorded by the PDD that will mean the PDD is farther in distance to where the mobile communication terminal signal is emitted from Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile communication device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, computer-based systems of the present disclosure may be configured to utilize software, or hardwired circuitry and/or hardware components that may be used in place of or in combination with software instructions to implement features consistent with principles of the disclosure. The software may be downloaded in electronic form, over a network, for example, or it may, alternatively or additionally, be provided and/or stored on non-transitory tangible media. Thus, implementations consistent with principles of the disclosure are not limited to any specific combination of hardware circuitry or hardware components and/or software.

The aforementioned examples are, of course, illustrative and not restrictive.

The invention claimed is:

1. A system for locating a mobile communication terminal, the system comprising:
    an interrogation device, which is configured to solicit a mobile communication terminal of a wireless communication network by imitating a base station of the wireless communication network to establish temporary communication with the interrogation device in an original bandwidth employed for communication between the interrogation device and the mobile communication terminal;

one or more processors configured to isolate the uplink bandwidth of the mobile communication terminal from the downlink bandwidth of the interrogation device by;

configuring the interrogation device to remove a downlink bandwidth, to the wireless communication terminal, from an end of the original bandwidth to create a narrowed downlink bandwidth;

calculating an uplink bandwidth at the end of the original bandwidth to be less than the downlink bandwidth removed from the original bandwidth; and reconfiguring the mobile communication terminal to uplink to the interrogation device on the calculated uplink bandwidth at the end of the original bandwidth;

a power detection device (PDD) configured to measure a power of a radio frequency (RF) signal emitted by the mobile communication terminal and having bandwidth filter configured to measure a bandwidth less than or equal to the calculated uplink bandwidth to locate the mobile communication terminal.

2. The system of claim 1, wherein the system is employed in a time-division duplexing (TDD) frequency network.

3. The system of claim 1, wherein the interrogation device is configured such that the removed downlink bandwidth is a non-standard bandwidth of the original bandwidth, and a narrowed downlink bandwidth is a non-standard bandwidth of the original bandwidth.

4. The system of claim 3, wherein the removed downlink bandwidth is removed from 1 to 45 percent of the original bandwidth end.

5. The system of claim 1, wherein the PDD is configured to:

be portable and move through multiple geographical positions in an area of interest;

at each of the geographical position, measure power of the mobile communication terminal RF signal; and determine when higher measurements of power indicate that the mobile communication terminal is close to the PDD and locate the mobile communication terminal.

6. The system of claim 1, wherein the system first receives an estimated location of the mobile communication terminal of interest.

7. The system of claim 1, wherein when the original bandwidth is 20 MHz, the system configures the uplink to be 0.4 MHz at the end of the 20 MHz and the downlink is configured to be 19 MHz from the start of the 20 MHz.

8. The system of claim 3, wherein when the original bandwidth is 20 MHz, the system configures the uplink to be 0.4 MHz at the end of the 20 MHz and the downlink is configured to be 19 MHz from the start of the 20 MHz.

9. The system of claim 7, wherein the PDD is configured to detect power at 0.2 MHz.

10. The system of claim 8, wherein the PDD is configured to detect power at 0.2 MHz.

11. A system for isolating an uplink bandwidth of a mobile communication terminal in a time-division duplexing frequency network, the system comprising:

an interrogation device, which is configured to solicit a mobile communication terminal of a wireless communication network by imitating a base station of the wireless communication network to establish temporary communication with the interrogation device in an original bandwidth employed for communication between the interrogation device and the mobile communication terminal;

one or more processors configured to isolate the uplink bandwidth of the mobile communication terminal from the downlink bandwidth of the interrogation device by;

configuring the interrogation device to remove a downlink bandwidth, to the wireless communication terminal, from the original bandwidth to create a narrowed downlink bandwidth;

calculating an uplink bandwidth to be less than and inside of the downlink bandwidth removed from the original bandwidth; and reconfiguring the mobile communication terminal to uplink to the interrogation device on the calculated uplink bandwidth of the original bandwidth, wherein there is no interference from the downlink signal to the uplink signal.

12. The system of claim 11, wherein the removed downlink bandwidth is at an end of the original bandwidth and the calculated uplink is at the end of the original bandwidth and less than the removed downlink bandwidth.

13. The system of claim 11, wherein the removed downlink bandwidth is a non-standard bandwidth of the original bandwidth.

14. The system of claim 11, wherein the calculated uplink bandwidth is a non-standard bandwidth of the original bandwidth and less than the removed downlink bandwidth.

15. The system of claim 11, wherein the system is employed in a time-division duplexing (TDD) frequency network.

16. A method for locating a mobile communication terminal, the method performed by processors, the method comprising:

operating an interrogation device, which is configured to solicit a mobile communication terminal of a wireless communication network by imitating a base station of the wireless communication network to establish temporary communication with the interrogation device in an original bandwidth employed for communication between the interrogation device and the mobile communication terminal;

isolating, by the one or more processors, the uplink bandwidth of the mobile communication terminal from the downlink bandwidth of the interrogation device by;

(i) configuring the interrogation device to remove a downlink bandwidth, to the wireless communication terminal, from an end of the original bandwidth to create a narrowed downlink bandwidth;

(ii) calculating an uplink bandwidth at the end of the original bandwidth to be less than the downlink bandwidth removed from the original bandwidth; and (iii) reconfiguring the mobile communication terminal to uplink to the interrogation device on the calculated uplink bandwidth at the end of the original bandwidth;

moving, by a user, a portable power detection device (PDD) configured to measure a power of a radio frequency (RF) signal emitted by the mobile communication terminal, through multiple geographical positions in an area of interest;

measuring, by the PDD, a power of an RF signal in a bandwidth less than or equal to the calculated uplink bandwidth at multiple geographical positions; and determining, by the user, a location of the mobile communication terminal when higher measurements of power are measured indicating that the mobile communication terminal is close to the PDD.

17. The method of claim 16, wherein the method is employed in a time-division duplexing (TDD) frequency network.

18. The method of claim 16, wherein when the original bandwidth is 20 MHz, the one or more processors configures the uplink to be 0.4 MHz at the end of the 20 MHz and configures the downlink to be 19 MHz from the start of the 20 MHz.

19. The method of claim 18, wherein the PDD is configured to detect power at 0.2 MHz.

* * * * *